United States Patent [19]
Sauve

[11] Patent Number: 6,073,990
[45] Date of Patent: Jun. 13, 2000

[54] TOOL DESIGN AND POST-MOLD PROCESS FOR SKINNED URETHANES WITH SNAP-IN COMPONENTS

[75] Inventor: Paul J. Sauve, Warren, Mich.

[73] Assignee: Chrysler Corporation, Auburn Hills, Mich.

[21] Appl. No.: 09/024,170

[22] Filed: Feb. 17, 1998

[51] Int. Cl.$^7$ .......................................... B60J 5/04
[52] U.S. Cl. .......................... 296/146.7; 296/39.1; 29/91; 29/91.1
[58] Field of Search .................. 296/39.1, 97.1, 296/97.5, 146.7, 214; 29/91, 91.1, 91.5; 428/134, 131

[56] References Cited

U.S. PATENT DOCUMENTS

| | | | |
|---|---|---|---|
| 3,379,469 | 4/1968 | Elia | 296/214 X |
| 4,494,789 | 1/1985 | Flowerday | 296/97.5 X |
| 4,711,483 | 12/1987 | Gulette et al. | 296/97.5 |
| 5,308,136 | 5/1994 | Schwarz et al. | 29/91.1 X |
| 5,522,128 | 6/1996 | Sauve | 29/709 |
| 5,553,907 | 9/1996 | Finn et al. | 296/97.5 X |
| 5,613,327 | 3/1997 | Sauve | 49/490.1 |
| 5,740,598 | 4/1998 | Sauve | 29/407.1 |
| 5,813,717 | 9/1998 | Wilson | 296/97.5 |

FOREIGN PATENT DOCUMENTS

| | | | |
|---|---|---|---|
| 2429685 | 1/1980 | France | 296/97.5 |
| 2619844 | 11/1977 | Germany | 296/97.5 |
| 404024119 | 1/1992 | Japan | 296/146.7 |

*Primary Examiner*—Dennis H. Pedder
*Attorney, Agent, or Firm*—James R. Yee

[57] ABSTRACT

An inner body panel that is configured to receive a snap-in component and a corresponding method of manufacture are provided. The inner body panel includes a urethane layer having an inner molded edge defining a first aperture and a glass mat layer affixed to the urethane layer. The glass mat has a second aperture that is smaller than the first aperture. The inner body panel also includes a cloth layer affixed to the glass mat layer that has a third aperture that is smaller than the first aperture. The cloth layer and the glass mat layer are trapped between the inner molded edge and the snap-in component, whereby a soft gasket fit between the snap-in component and the inner molded edge is produced and damage to the inner body panel is minimized when the snap-in component is inserted into the inner body panel.

5 Claims, 3 Drawing Sheets

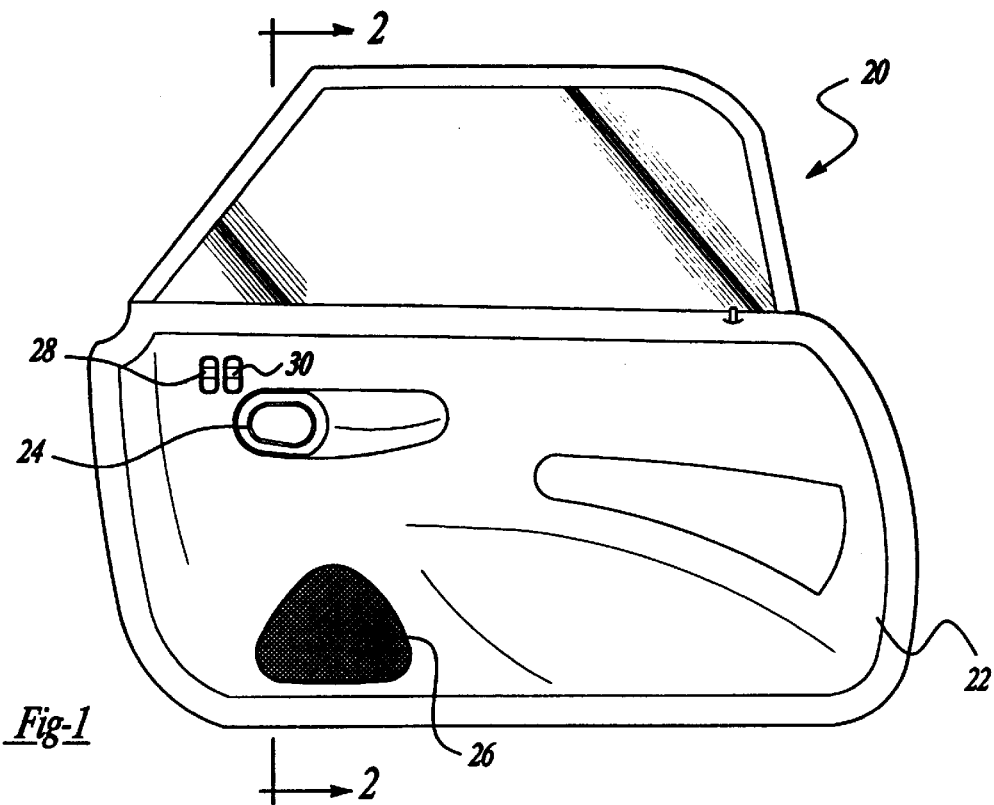
Fig-1
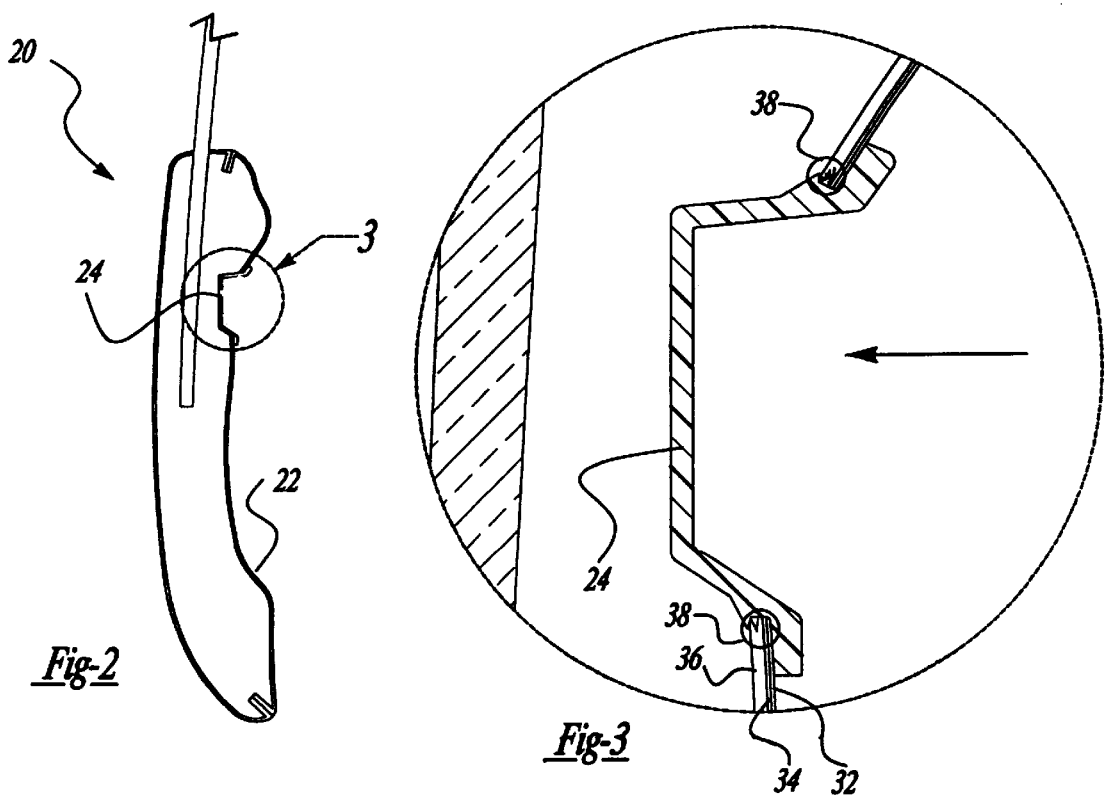
Fig-2
Fig-3

TOOL DESIGN AND POST-MOLD PROCESS FOR SKINNED URETHANES WITH SNAP-IN COMPONENTS

BACKGROUND OF THE INVENTION

1. Technical Field

The present invention generally relates to automotive inner body panels and, more particularly, the present invention relates to an apparatus and corresponding method of manufacturing an inner body panel that receives a mating component.

2. Discussion

In general, inner body panels for automotive vehicles are individually manufactured and subsequently attached to the vehicle. Inner body panels for automotive vehicles include the instrument panel, floor console, rear quarter, and door panels, with each having unique manufacturing and assembly design parameters. These panels are sometimes manufactured by molding a urethane, glass matting, and foam-backed vinyl or cloth. For example, a molded inner door panel is typically molded by placing a layer of foam-backed vinyl or cloth on a mold surface, placing fiberglass or a glass matting on top of the foam-backed vinyl or cloth, and closing the mold such that an inner space of approximately three to five millimeters is created between the upper and lower surfaces of the mold cavity. At this time, a two part thermoset urethane is mixed and introduced into the mold cavity. The mixing of the two part urethane causes a chemical reaction which creates a hardened urethane substrate having the shape as defined by the mold.

Once the inner trim panel is created, it is removed from the mold and apertures for receiving snap-in components are cut into the inner trim panel, generally (but not exclusively) using water jets or a die punch. This tooling and trimming of the glass-reinforced urethane panel produces trimmed holes that in turn present a rigid and brittle edge to any mating component, therefore resulting in a product that is susceptible to fracture failures, compromises component retention, and increases buzz, squeak and rattles (BSR).

In view of the foregoing, it is one object of the present invention to provide an apparatus and method that reduces the undesirable structural flaws and BSR in inner trim panels that occur when a mating component is introduced. Furthermore, additional advantages and features of the present invention will become apparent from the subsequent description and claims taken in conjunction with the accompanying drawings.

SUMMARY OF THE INVENTION

In accordance with the teachings of the present invention, an inner trim panel that is configured to receive a snap-in component, and a corresponding method of manufacture are provided. The inner panel includes a urethane layer having an inner molded edge defining a first aperture and a glass mat layer affixed to the urethane layer. The glass mat has a second aperture that is smaller than the first aperture. The inner panel also includes a cloth layer affixed to the glass mat layer that has a third aperture that is smaller than the first aperture. The cloth layer and the glass mat layer are trapped between the inner molded edge and the snap-in component. A soft gasket fit between the snap-in component and the inner molded edge is produced, and damage to the inner body panel is eliminated when the snap-in component is inserted into the inner body panel. BSR is eliminated by such an assembly.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

Other objects and advantages of the invention will become apparent upon reading the following detailed description and upon reference to the following drawings, in which:

FIG. 1 is a perspective view of a vehicle door have a skinned urethane inner trim panel;

FIG. 2 is a plan view of FIG. 1 along line 2—2 thereof;

FIG. 3 is an enlarged view of circle 3 within FIG. 2;

DETAILED DESCRIPTION OF THE PREFERRED EMBODIMENT

Figure 4:
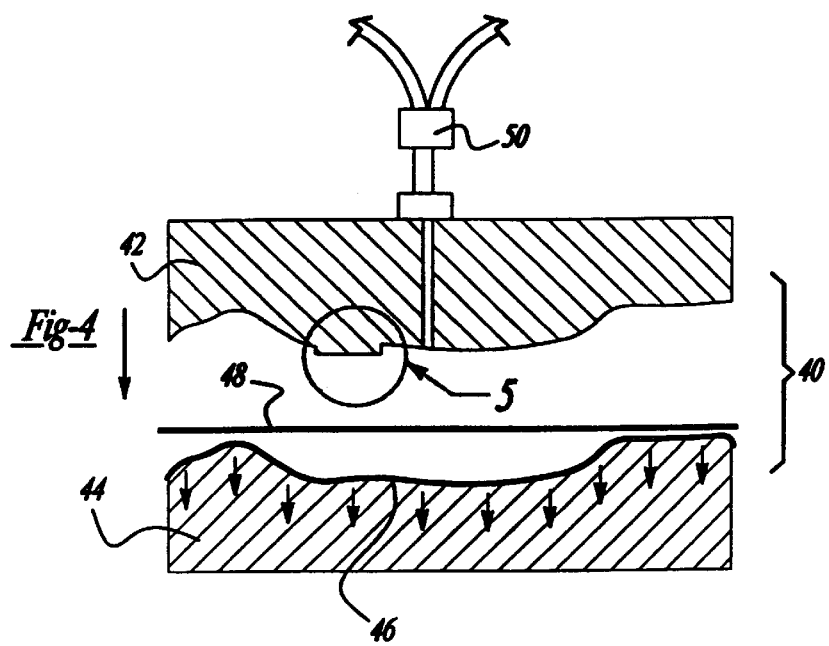
FIG. 4 is a diagrammatic cross-sectional view of a mold for molding a skinned urethane inner trim panel in accordance with the principles of the present invention.

The following description of the preferred embodiment is mainly exemplary in nature and is in no way intended to limit the invention or its application or uses.

FIG. 1 shows a perspective view of a vehicle door 20 having a skinned urethane inner body panel 22, and FIG. 2 presents a plan view of the vehicle door 20 along line 2—2 of FIG. 1. Referring to FIG. 1, it can be seen that the skinned urethane inner body panel 22 receives snap-in mating components, such as a plastic pull cup 24 that may house the latch mechanism for opening and closing the door, an audio speaker 26, a switch bezel for the power windows 28, and a switch bezel for the door lock 30. It should be understood that the present invention is not limited to skinned urethane panels for vehicle doors, but is applicable to a wide variety of inner trim components including, but not limited to, instrument panels, floor consoles, and rear quarters.

As illustrated in FIG. 2, the plastic pull cup 24 is a snap-in component that is inserted into a corresponding aperture in the skinned urethane inner body panel 22. The skinned urethane inner body panel 22 is generally composed of three layers. Referring to the enlarged view of FIG. 3, the three layers are a foam-backed vinyl or cloth 32, a fiber-glass mat 34, and the urethane 36. Prior to the present invention, the apertures created in the skinned urethane panel 22 had the same dimensions for each of the three layers (32, 34, 36). With this known structure, a snap-in component (i.e., plastic pull cup 24 in this illustration) which is inserted into the panel 22 is likely to cause damage, as the urethane 36 is brittle. This compromises retention and increases BSR risk. In order to reduce the damage caused to the panel 22 during the insertion of the snap-in mating component, the present invention provides a tool design, molding process, and post mold process by which skinned urethane inner body panels having mating components may be manufactured.

As diagrammatically shown in FIG. 4, the mold for molding a skinned urethane inner body panel 22 in accordance with the principals of the present invention is shown. The mold 40 has an upper die 42 and lower die 44 with corresponding cavities that define the shape of the panel 22.

In operation, foam-backed vinyl or cloth 46 is laid upon the lower die 44 and a vacuum may be introduced such that the foam-backed vinyl or cloth 46 conforms to the cavity contours of the lower die 44. For reinforcement purposes, a glass matting 48 is laid upon the foam-backed vinyl or cloth 46. (It should be noted that alternatively, chopped glass may be introduced with the two part urethane during injection.) This is followed by the closing of the mold 40 and the introduction of a two-part thermosetting urethane through the injection nozzle 50. Once the two-part thermosetting urethane is cured, the mold 40 is opened and the formed panel is removed from the mold 40.

Figure 5:
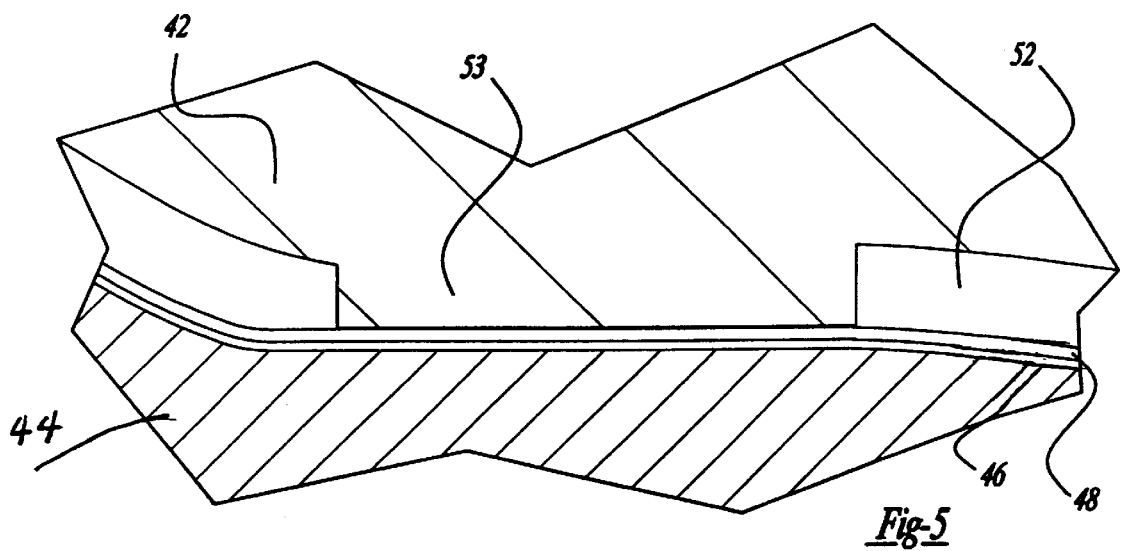
FIG. 5 is an enlarged view of circle 5 with the mold closed and the two part thermoset urethane introduced in accordance with the principles of the present invention.
Figure 6:
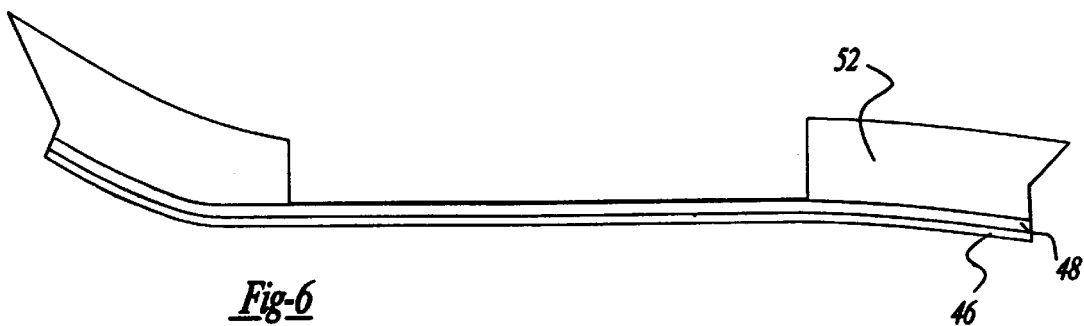
FIG. 6 is an enlarged view of the skinned urethane inner trim panel that is produced from the mold section as shown in FIG. 5 and in accordance with the principles of the present invention.

As can be seen in FIG. 5, which shows an enlarged view of circle 5 in FIG. 4, the upper die 42 includes a projection in the cavity (generally indicated at 53) that prohibits the uncured urethane from filling the portion of the panel 22 that is to have an aperture for receiving a snap-in mating component. Therefore, because the uncured urethane does not enter the portion defined by the projection 53, the inner body panel section that is to receive a snap-in mating component has a layer of foam-backed vinyl or cloth 46 and glass matting 48, however, the urethane is absent in this area (as shown in FIG. 6).

Figure 7:
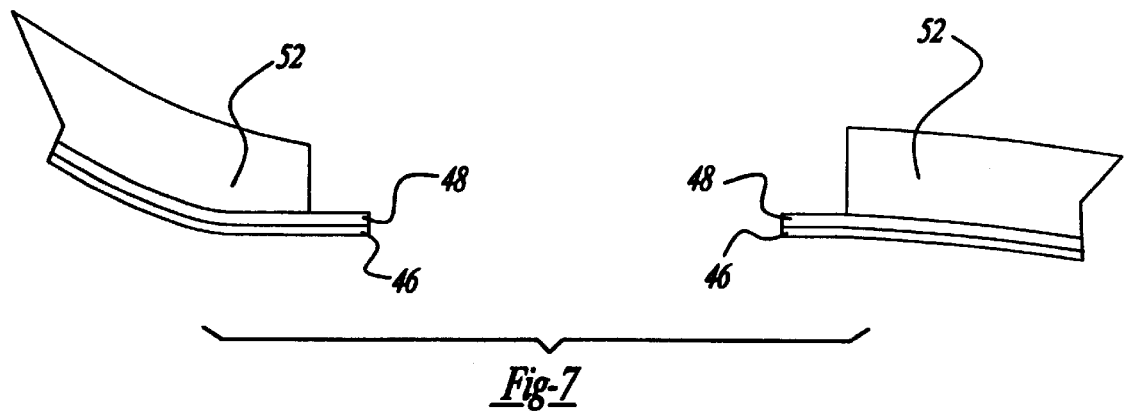
FIG. 7 is the skinned urethane inner trim panel of FIG. 6 having the aperture cut in the vinyl and glass mat that is slightly smaller than the mold formed aperture in the urethane in accordance with the principles of the present invention.
Figure 8:
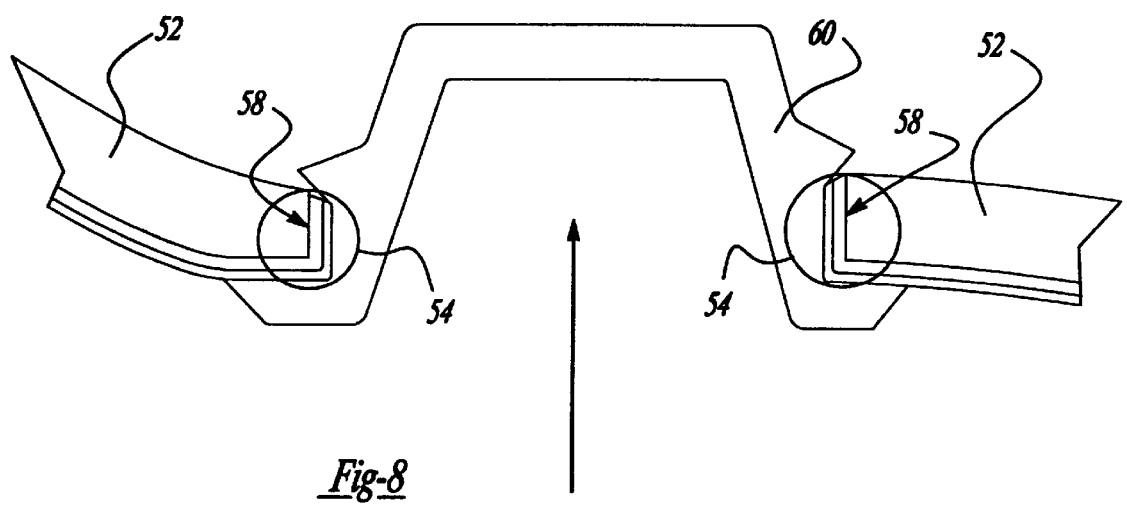
FIG. 8 is the skinned urethane inner trim panel that has received a mating component in accordance with the principles of the present invention.

The formed panel subsequently undergoes a trimming operation in which a hole is cut through the vinyl or cloth 46 and glass matting 48. As illustrated in FIG. 7, the aperture created in the vinyl or cloth 46 and glass matting 48 is slightly smaller than the aperture in the urethane 52 that was created during the molding process. By referring to FIG. 8, it can be seen that the dual apertures in the panel result in the overlapping vinyl or cloth and glass (generally indicated at 54) becoming trapped between the molded edge of the urethane 58, and the mating component 60. This reduces the likelihood of a stress fracture occurring in the tooled edge of the urethane, and creates a soft gasket fit between the mating component 60 and the tooled edge of the urethane 58. In this fashion, snap-in mating component retention is increased and BSR is decreased.

From the invention as described, it will be obvious that the same may be varied in many ways. Such variations are not to be regarded as a departure from the spirit and scope of the invention, and all such modifications as would be obvious to one skilled in the art are intended to be included within the scope of the following claims.

While the above description constitutes the preferred embodiment of the invention, it will be appreciated that the invention is susceptible to modification, variation, and change without departing from the proper scope or fair meaning of the accompanying claims.

We claim:

1. A vehicle inner body panel configured to receive a snap-in component comprising:

a urethane layer having first and second sides and a first aperture formed therethrough, said first aperture being bordered by an inner molded edge of said urethane layer extending between said first and second sides;

a glass mat layer affixed to said first side of said urethane layer, said glass mat layer having a second aperture formed therethrough with a diameter that is smaller than a diameter of said first aperture, said second aperture being coaxially aligned with said first aperture; and a cloth layer affixed to said glass mat layer opposite said urethane layer, said cloth layer having a third aperture formed therethrough with a diameter that is smaller than said diameter of said first aperture and substantially equal to said diameter of said second aperture, said third aperture being coaxially aligned with said first and second apertures wherein a difference between said diameter of said first aperture and said diameter of said second and third apertures is substantially equal to a width of said inner molded edge of said urethane layer such that said cloth layer and said glass mat layer are trapped between said inner molded edge and said snap-in component with an inner edge of said cloth layer and said glass mat layer terminating at a location substantially aligned with said second side of said urethane layer, whereby a soft gasket fit between the snap-in component and said inner molded edge is produced when the snap-in component is inserted into the inner body panel.

2. The inner body panel of claim 1, wherein said urethane layer is a two part thermoset urethane.

3. The inner body panel of claim 1, wherein said inner body panel is an inner body trim panel.

4. The inner body panel of claim 1, wherein said cloth layer is foam-backed vinyl.

5. A vehicle inner body panel configured to receive a snap-in component comprising:

a urethane layer having first and second sides and a first aperture formed therein defined by an inner molded edge of said urethane layer;

a glass mat layer affixed to said first side of said urethane layer; and a cloth layer affixed to said glass mat layer opposite said urethane layer, said glass mat layer and cloth layer having a common second aperture formed therein defined by an edge of said glass mat layer and said cloth layer, said second aperture having a diameter which is smaller than a diameter of said first aperture by an amount equal to a thickness of said inner molded edge such that said cloth layer and said glass mat layer are trapped between said inner molded edge and said snap-in component with said edge of said glass mat layer and said cloth layer residing at a location substantially aligned with said second side of said urethane layer, whereby a soft gasket fit between the snap-in component and said inner molded edge is produced when the snap-in component is inserted into the inner body panel.

* * * * *